United States Patent

Wanstrath et al.

[11] Patent Number: 5,591,460
[45] Date of Patent: Jan. 7, 1997

[54] APPARATUS FOR AUTOMATED WINDSHIELD REPAIR

[76] Inventors: Kerry A. Wanstrath; Daniel M. Wanstrath, both of 434 Turner Dr., Durango, Colo. 81301

[21] Appl. No.: 411,985

[22] Filed: Mar. 28, 1995

[51] Int. Cl.⁶ ..................................... B32B 35/00
[52] U.S. Cl. .............. 425/12; 425/13; 425/155; 264/36
[58] Field of Search ................ 425/12, 13, 136, 425/155; 264/36; 156/94

[56] References Cited

U.S. PATENT DOCUMENTS

| | | | |
|---|---|---|---|
| 3,562,366 | 2/1971 | Sohl | 264/36 |
| 3,841,932 | 10/1974 | Forler et al. | 156/94 |
| 3,993,520 | 11/1976 | Werner et al. | 425/13 |
| 4,132,516 | 1/1979 | Story | 425/12 |
| 4,280,861 | 7/1981 | Schwartz | 425/13 |
| 4,597,727 | 7/1986 | Birkhauser, III | 425/12 |
| 4,681,520 | 7/1987 | Birkhauser, III | 425/12 |
| 4,744,841 | 5/1988 | Thomas | 425/13 |
| 4,826,413 | 5/1989 | Matles | 425/12 |
| 4,961,883 | 10/1990 | Jacino et al. | 425/12 |
| 5,156,887 | 10/1992 | Addison et al. | 156/94 |
| B1 5,116,441 | 11/1993 | Campfield | 156/94 |

OTHER PUBLICATIONS

Glass Technology Brochure, 1992.

*Primary Examiner*—Robert Davis
*Attorney, Agent, or Firm*—Kenton L. Freudenberg; Maxwell C. Freudenberg

[57] ABSTRACT

Portable self-contained apparatus for repairing a glass windshield by filling a damaged area with a repair material. An injector nozzle having a reservoir for holding an uncured liquid repair material is sealed over the damaged area of the windshield by vacuum cups. The reservoir is automatically supplied with timed alternating vacuum and positive precision controlled pressures from a fluid pressure device controlled by preprogrammed computer circuitry which is responsive to conditions of timing controls and of sensor controls for measuring and regulating the amounts and durations of the vacuum and positive pressures applied to the reservoir. After the apparatus is turned on and any one of several selectable control programs is activated by a single selection switch, the control circuitry automatically responds to timing and sensed pressure condition signals for applying several cycles of alternating application of vacuum and pressure to the reservoir without operator intervention, always starting with application of vacuum and ending with positive pressure. The fluid pressure device may utilize one or more electric battery operated pumps or it may utilize a container of pressurized gas to directly supply controlled positive pressure to the reservoir and drive a suitable pump for supplying a controlled vacuum to the reservoir. The apparatus controls are enclosed in a case having a program selecting keyboard and connections for a pressure hose for the injector nozzle. Connections are also provided for a glass drill, an ultraviolet curing lamp, battery recharging or for an external power source.

26 Claims, 8 Drawing Sheets

APPARATUS FOR AUTOMATED WINDSHIELD REPAIR

BACKGROUND OF THE INVENTION

Numerous tools and techniques have been developed for repair of damaged plate glass surfaces, especially those made of laminated "safety" glass such as is used in automotive windshields. The cost benefit of repairing small cracks rather than replacing an entire windshield to restore the visual integrity of the windshield is substantial. Common windshield damage, such as that caused by impact from small rocks or gravel, may be in small chips, cracks, "bullseyes" and "stars." While such damage may be confined to a small area, and may or may not significantly affect the transparency or optical clarity of the windshield, repair of such damage may be readily accomplished and may prevent further damage due to cracks which may spread from the damaged area as a result of stress created by, for example, temperature induced expansion and contraction of the glass or mechanical vibration.

The common methods of repair involve variations of the basic steps of (1) providing an airtight seal around the broken area (2) drawing a vacuum to remove air from the broken area and (3) introducing a suitable resin into the broken area under either ambient atmospheric pressure or under a positive pressure.

In such glass repair, the success of the repair, both structurally and visually, may be primarily dependent on the extent to which the damaged area is filled with repair resin without leaving voids or air bubbles within the repaired area. It has been recognized in the prior art that alternating cycles of vacuum and pressure may be desirable in order to maximize the removal of air from within the broken area and of air which may be entrained or dissolved in the repair resin.

U.S. Pat. No. 3,765,975 to Hollingsworth describes a method involving the application of both vacuum and positive pressures to repair resin at a repair area. The pressure changes are created by manual operation of a syringe plunger.

U.S. Pat. No. 3,993,520 to Werner, disclosing a device for repairing glass, describes manually adjustable screw actuators to select the application of alternating vacuum and pressure cycles to accomplish the removal of entrained air from the broken area.

U.S. Pat. No. 4,047,863 to McCluskey shows a continuously operable electrical vacuum pump connected by a line to resin in a glass crack repair chamber and having finger controlled means for controlling the vacuum by admission of air to the line. It further describes the use of a manually operated mechanical piston to apply pressure to the resin.

U.S. Pat. No. 4,280,861 to Schwartz discloses a device employing a vacuum pump to hold an enclosure cup in place to enable insertion of a syringe with resin for repairing glass. Schwartz also shows a system of manually selectable shut-off valves which can be manipulated to control a remote compressor pump or a remote vacuum pump which may be used to apply pressure or vacuum to a pool of resin material. Gauges inform the operator as to the amount of pressure or vacuum being applied during the repair process being observed.

U.S. Pat. No. 4,597,727 to Birkhauser shows a glass repair method with an arrangement of a pressure gauge and manually adjustable valves to selectively switch a manually operated pump from creating in successively increasing steps the degree of vacuum at the repair material to a final step of applying positive pressure to the repair material.

U.S. Pat. No. 4,032,272 to Miller shows another break repair device using a vacuum pump whereby the device is held by vacuum over the break in the glass.

The prior art methods and systems have typically required the attention of and control by the technician through the time required to complete the repair process, i.e. reading gauges, recording times and manually adjusting valves. Such operator control has also often required a degree experience or skill by the operator. In contrast the present invention is intended to provide a system in which the device is essentially automated to allow unattended operation even by a relatively unskilled operator.

SUMMARY OF THE INVENTION

The present apparatus is designed to repair stone-damaged windshields and avoid the high cost of replacement. The system is intended only for repairs on dual-plate, laminated, safetyglass windshields, not single-sheet glass. Most stone damaged windshields can be repaired or considerably improved in appearance. However, with a few the damage is too extensive. A good repair job will leave only a small dot on the outside surface of the glass, practically unnoticeable.

The present invention provides a self contained portable apparatus and method in which repair to a damaged area of a windshield may be accomplished to provide a strong, permanent bond, preventing cracks from spreading further and eliminating expensive replacement in an essentially unattended manner requiring little input and without intervention from the operator.

The primary elements of the present apparatus are contained within a main case or enclosure which houses a power source such as a rechargeable battery, an electrically operated air pump which is powered by the battery, pressure and vacuum lines from the air pump to air valve assemblies which automatically control air flow to and from a primary air hose line, a electrical transducer which is capable of varying an electrical signal in response to the degree of pressure or vacuum in the primary hose line, and an electrical control board which incorporates circuitry responsive to the electrical signal to provide a means of correlating and coordinating the operation of the pump, valve assemblies and other respective control elements.

The exterior of the main case is provided with a membrane control panel having a number of individually identified membrane buttons or switches which allow the operator to select a specific preprogrammed operating sequence for the control elements with the push of preferably just a single button. A liquid crystal display provides a visual display of alphanumeric information to indicate the operational status of the device.

Because it may be desirable to drill the damaged area to provide a clear path from the surface of the glass to the interior of the damaged area in to which where resin will be injected, a port to allow electrical connection of a battery operated adjustable speed electric drill is provided at a side of the main box.

The main case is further provided with an electrical receptacle which allows connection of either a source of power for the purpose of recharging the internal battery or an additional electrical device which may be powered by the battery, such as an ultraviolet lamp used to cure the resin.

At the start of a repair operation the damaged area must be inspected to assure that there is no water in the break. Water can get into a break from washing the windshield or from rain, snow, etc. Water in a break may take as long as a half-day to dry out in a hot, dry climate, and longer in cold, humid conditions. To dry out a break quickly, remove surface moisture with a towel. Clean out the break pit and remove any loose glass or dirt. The break may dry out faster if drilled at this point. Next, a pit cleanout nozzle may be connected to the air pressure line which will supply air pressure during the repair operation. This line can be actuated manually by pressing the "pressure" button on the control panel.

The present apparatus is completely portable and contains sufficient battery power when fully charged to perform from 25 to 40 repair operations. When the battery gets too low the apparatus is automatically shut off by the control circuitry.

After a break is dried and cleaned out, a resin injector assembly is anchored to the windshield. A conventional resin injector body is a simple tubular structure having central reservoir chamber which holds sufficient liquid resin (approximately 1 cubic centimeter) to fully fill a repaired area. The injector tip is sealed against the glass surface by means of an elastomer O-ring seal which surrounds an orifice in the injector tip to allow the reservoir chamber to communicate with the damaged area. An upper end of the reservoir chamber communicates directly with the primary air line.

The injector body is threaded into an injector supporting bridge which is anchored against the windshield using a suction cup on the underside of the bridge. Bridge leveling screws are positioned opposite the injector body and adjusted to keep the injector tip in tight contact with the glass surface with the injector body oriented perpendicular to the glass surface to insure that the O-ring creates a secure seal between the injector tip and the glass surface around the damaged area.

In use of this automated system, the resin injector assembly is secured and sealed in place over a damaged portion of a windshield in such a manner that the resin reservoir within the assembly communicates with the interior of the break interstices at the damaged area though the resin nozzle. The resin reservoir communicates with a primary hose which is capable of selectively applying either vacuum or air pressure to the resin reservoir and the damaged area by means of a pair of "three-way" mechanical valves which are electrically operated simultaneously to allow the primary hose to communicate with either the inlet or outlet of an electrically operated air pump. A transducer or pressure sensor located along the primary hose path and within the main case provides a means of measuring the pressure or vacuum in the line, and transmits the measured pressure in the form of a pressure indicating electrical signal to a main printed circuit control board having computerized circuit means which in turn controls the operation of the air pump and the position of the three-way valves to control whether pressure or vacuum will be supplied to the reservoir of the resin injector.

With the damaged area prepared as may be appropriate and the injector in position, the apparatus of the present invention is operated by means of a membrane switch on the face of a main control unit. Once set in operation, the device automatically steps through a sequence which has been preprogrammed into the apparatus and which may be selected to correspond to the type of damage being repaired. In an example of a typical sequence, the air pump is activated with the vacuum/pressure valves being controlled to supply vacuum to the injector. When the transducer in the air line senses a sufficient vacuum, i.e. 30 inches of mercury, the vacuum is held for a approximately 90 seconds or other preprogrammed period of time. After the programmed time has elapsed, the three-way valve means are electrically operated to reverse the airflow so that the air pump supplies pressure to the injector via the primary hose line. When the transducers in the air line sense a sufficient pressure, for example 30 p.s.i., this pressure is maintained for approximately 30 seconds or other preprogrammed period of time. The sequence of application to the hose lines of preprogrammed vacuum followed by pressure is programmed to be automatically repeated several times, typically with variations in the durations of vacuum and pressure along with variations in the amount or degree of pressure applied. The pressure will typically be slightly increased with each step so that the procedure's greatest pressure is achieved at the completion of the procedure.

The system of the present invention is externally very simple to the operator, but it is internally so operationally sophisticated that guesswork on the part of the operator becomes a thing of the past. Experienced repair professionals will appreciate the simplicity and convenience of one-touch operation. The invention achieves productivity increase, improved operator time management and minimization of operational costs.

The inefficiencies of previous methods of windshield repair have been eliminated by computer experts and windshield repair experts who are skilled in this art and have implemented the features of this invention in a series of computer programs that automate all the steps for a repair operation on a damaged windshield area.

Since about ninety percent of improper or unsatisfactory windshield repairs are the result of air trapped in a break, the present apparatus incorporates fast and automatic alternation between vacuum and pressure cycles which provides very efficient air removal from break interstices as well as removing entrained air from the liquid repair material. Rapid pulsing of vacuum and pressure using the present apparatus creates an inertial rebound effect which alternately expands and compresses the air in a break. This push-pull action removes air in a highly efficient fully automated manner.

It is an object of the present to provide a glass and windshield repair method and apparatus which is fully automated and which requires little skill on the part of the operator.

It is an object of the present to provide a glass and windshield repair method and apparatus which may be preprogrammed to automatically provide a sequence of steps for the introduction of resin into a damaged area of glass which are correlated to the particular type of damage being repaired in order to achieve the best possible results in the repair.

It is another object of the present to provide a portable glass and windshield repair method and apparatus which is suitable for use at remote sites away from electrical outlets.

DETAILED DESCRIPTION OF THE INVENTION

Figure 1:
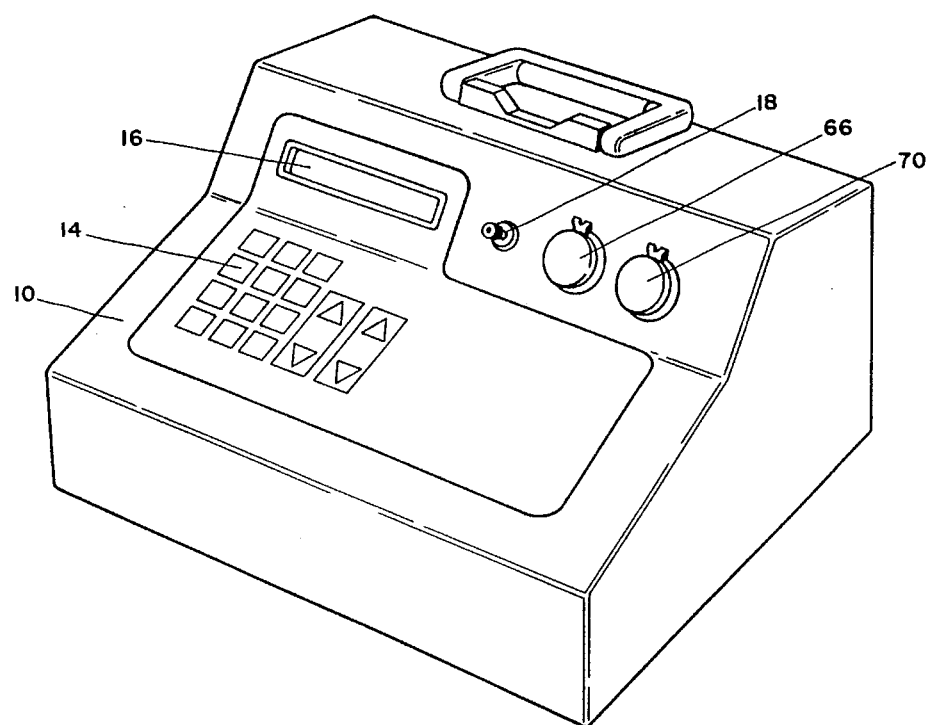
FIG. 1 is a perspective view of the main case of the preferred apparatus embodiment of the present invention illustrating a control panel and keyboard and a connection point for a primary air hose to be connected to a detachable resin injector assembly.
Figure 2:
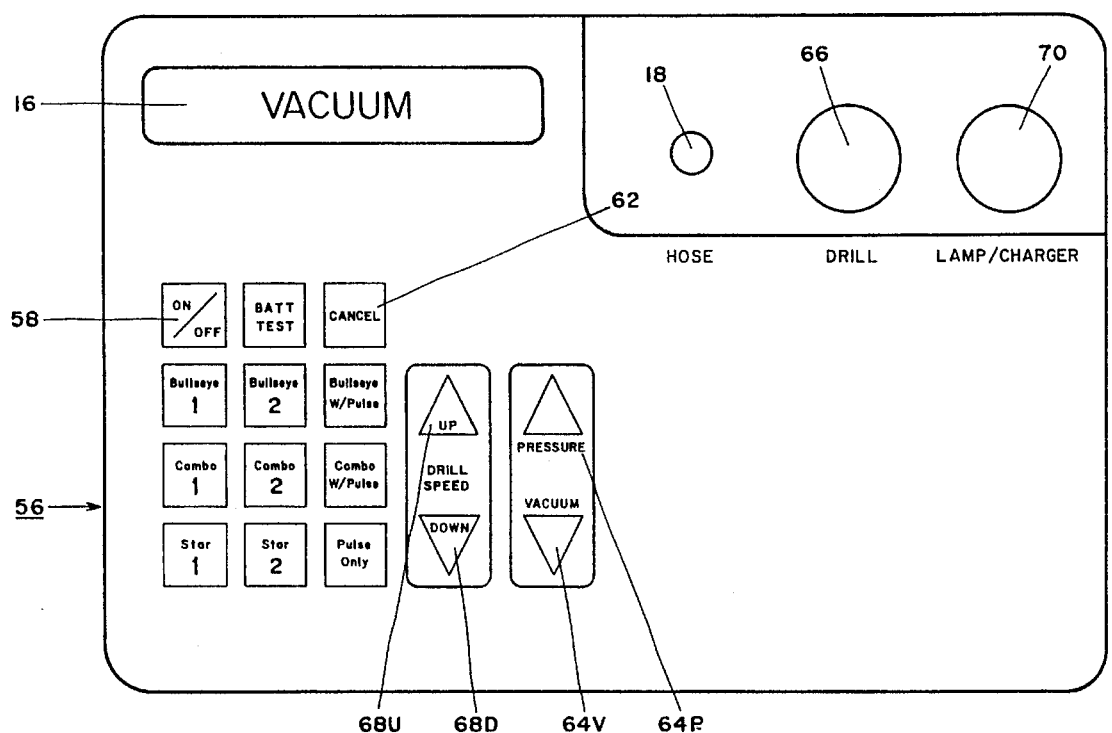
FIG. 2 is a front view of the control panel of the case of FIG. 1 and showing status LCD window, membrane control switches, the air hose connecting point and electrical receptacles for an electric drill, an ultra-violet curing lamp and auxiliary 12 v. electrical connections.

The preferred embodiment of the invention has a main control box or case 10, shown in FIG. 1, which contains, or is adapted to be mechanically or electrically connected to, all of the primary elements of the present apparatus. FIG. 2 shows the front control panel 11 of the case 10 with an on/off switch 12 and a plurality of membrane switches shown generally at 14 for manually selecting the nature of the repair operation to be automatically controlled by the apparatus. A liquid crystal display (LCD) panel 16 shows at all times the current operating condition of the apparatus. Most of the primary elements are diagrammatically shown in FIG. 5, described in detail hereinafter, which illustrates their mechanical or electrical relationships. The principal external connection of the apparatus case 10 is via a primary or main hose line 42 (FIGS. 5–9) from a hose connector 18 "on the case 10 in FIG. 1" to a known type of injector body or injection nozzle 22 having an interior reservoir chamber 23 for a liquid repair material and clamped in sealed relationship, with an O-ring seal 25, over a break in a damaged area of a windshield by a known type of bridge structure 24 as seen in FIGS. 3–4.

Figure 3:
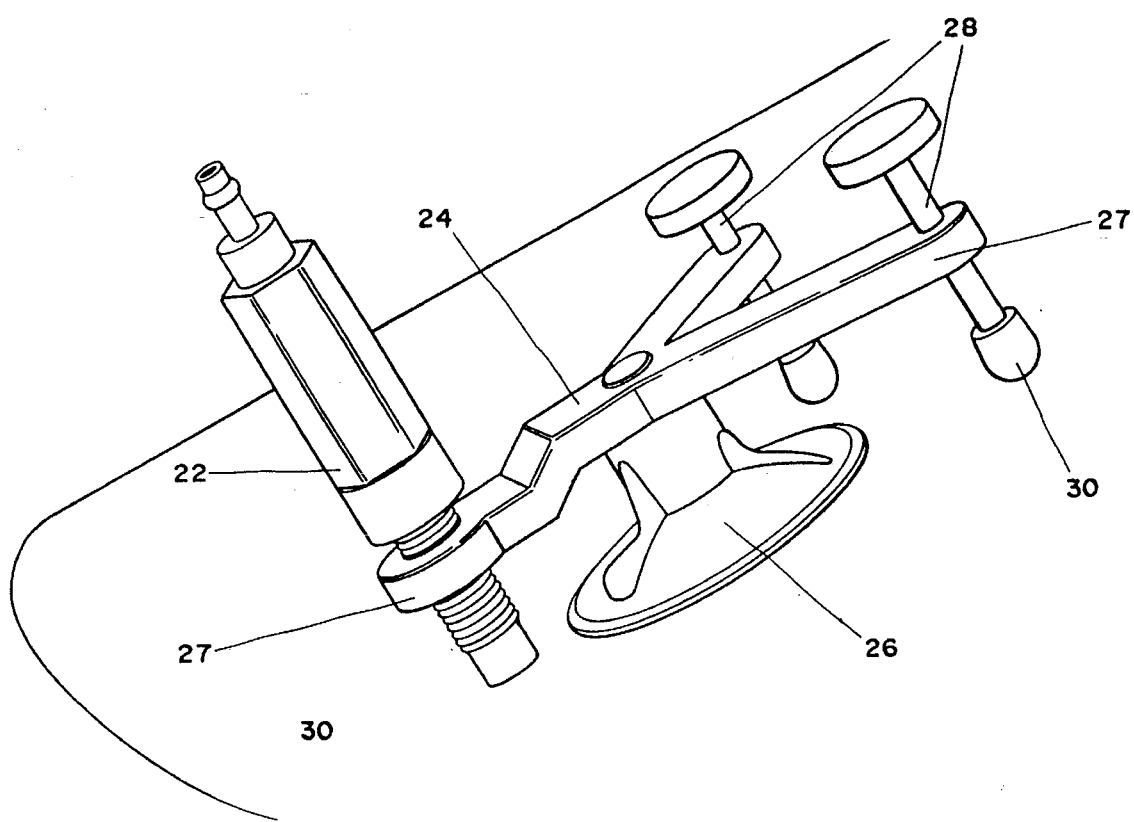
FIG. 3 is perspective view of a bridge structure for supporting an injector device of FIG. 4 centered over a windshield break to be repaired.
Figure 4:
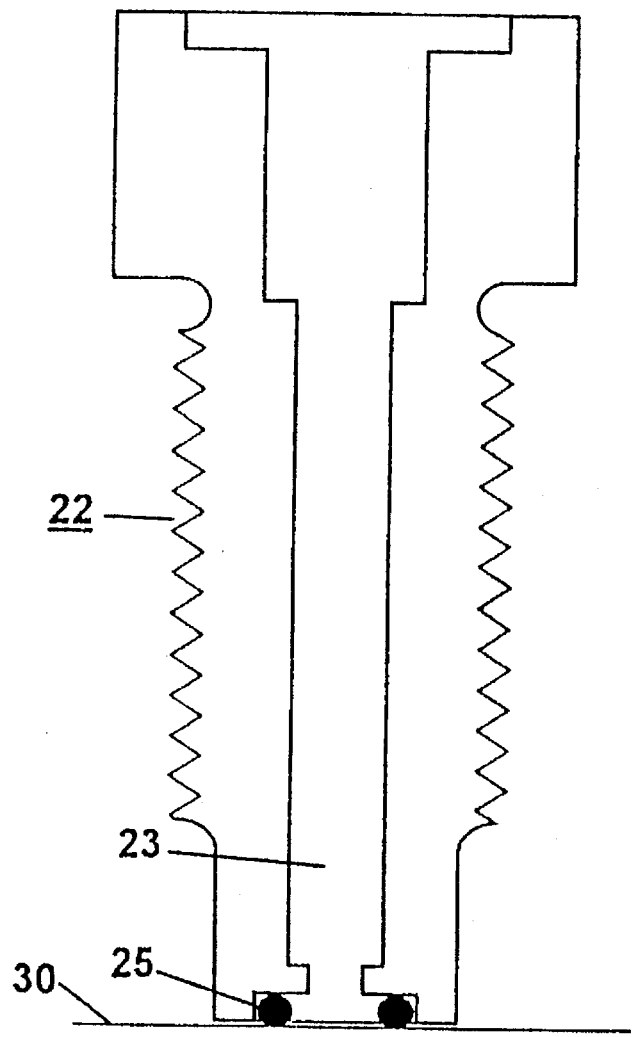
FIG. 4 is a cross section of a resin injector device shown oriented perpendicular to a windshield surface and which may be used with the present invention.

The bridge structure 24 in FIG. 3 is anchored to the windshield by means of a suction cup 26. The bridge has three equally spaced essentially coplanar arms 27 projecting from the suction cup 26 with the injector 22 threaded in the end of one arm of the bridge and adjusting screws 28 threaded in the ends of the other two arms to enable adjustment of the injector to keep it perpendicular to the windshield surface 30 as seen in FIG. 4 and to maintain a desired sealing pressure of the O-ring 25 in the end of the nozzle 22 against the windshield surface.

Figure 5:
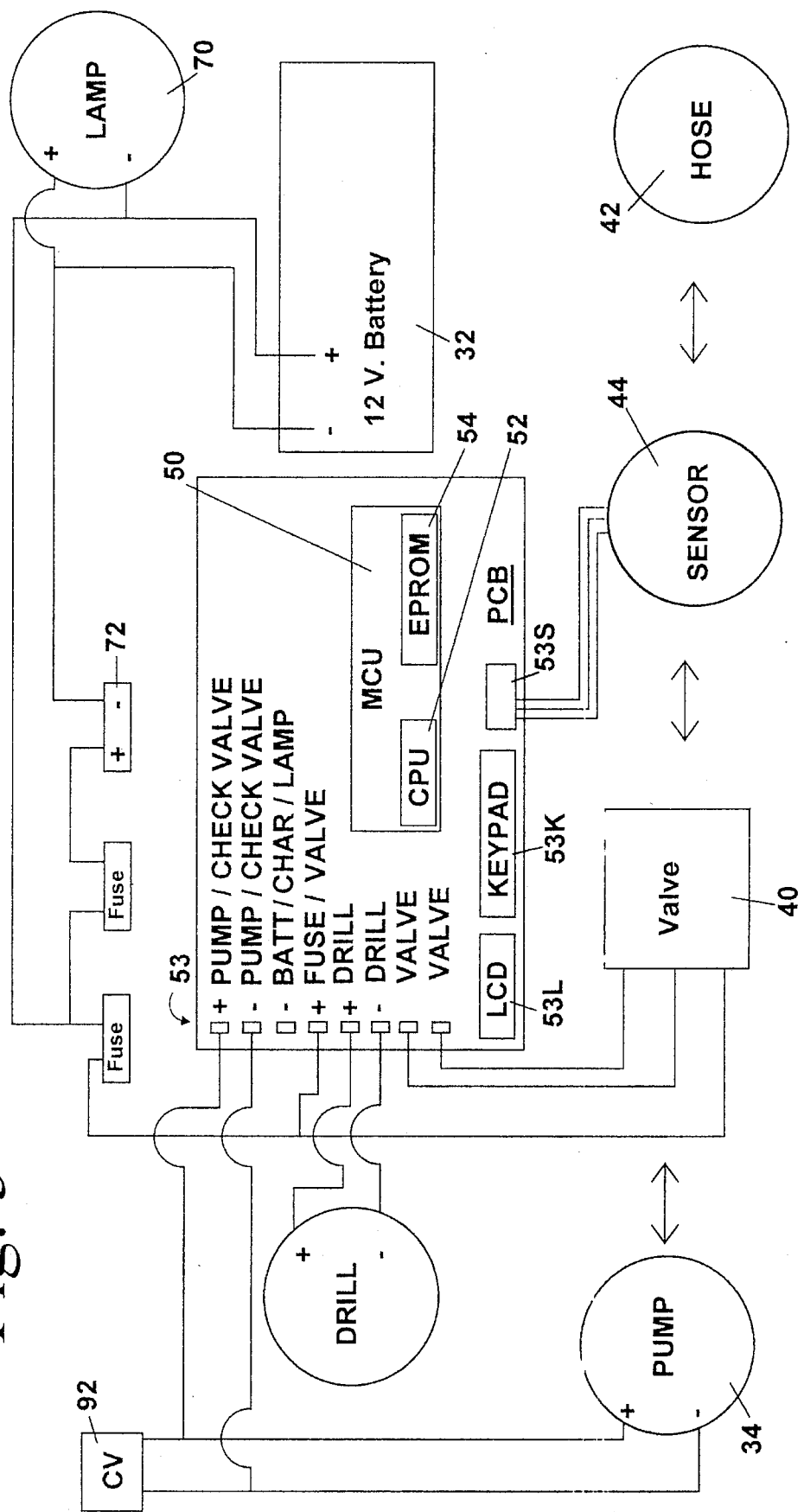
FIG. 5 is a schematic diagram showing the arrangement of a printed circuit board which contains computerized control circuitry with its associated valves, pressure sensing transducer and pump of the preferred embodiment of the present invention.
Figure 6:
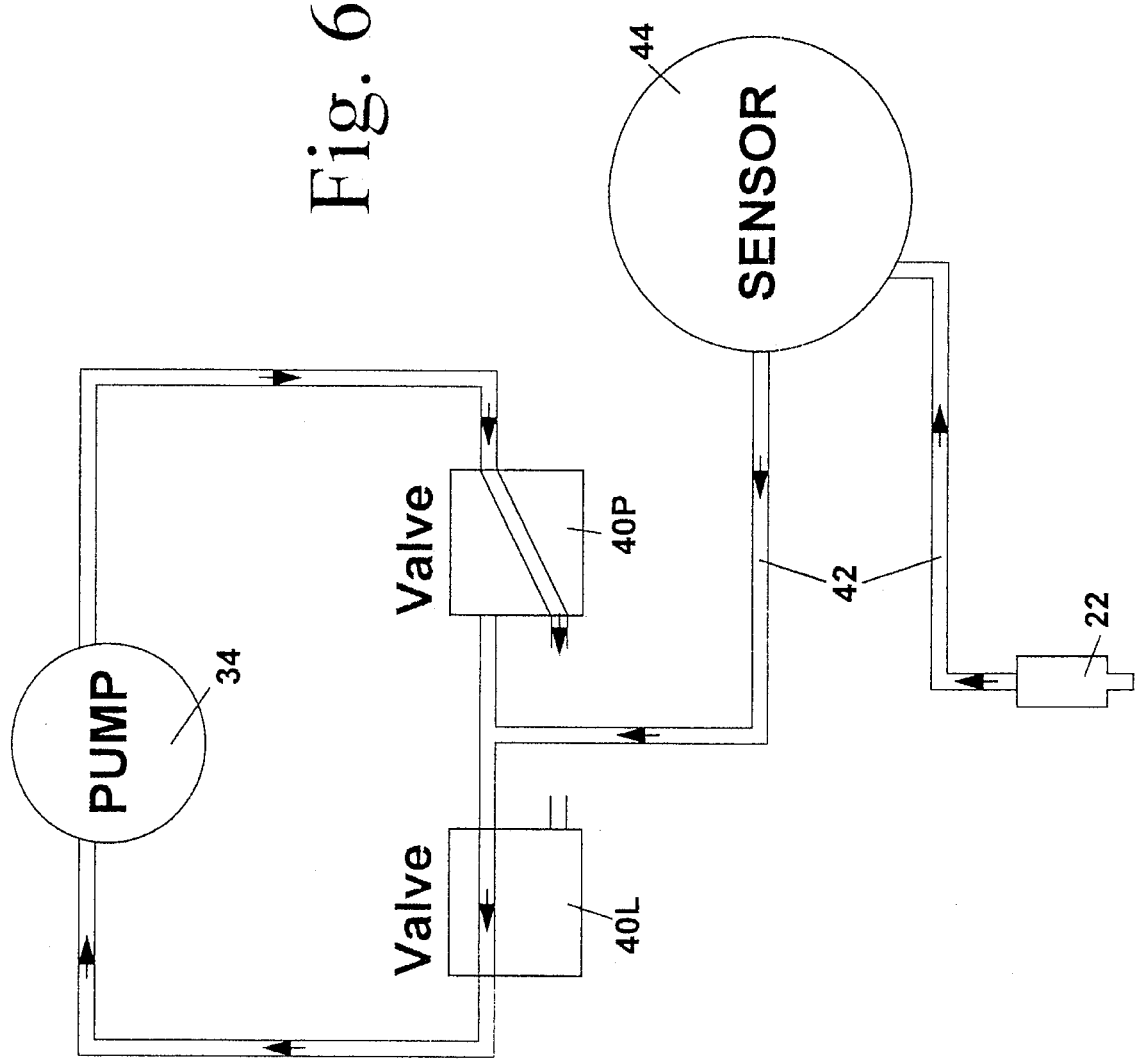
FIGS. 6–7 are diagrams showing the arrangement of a pair of three-way valves, pressure sensing transducer and pump of the preferred embodiment of the present invention for applying vacuum and pressure, respectively, to the injector device.
Figure 7:
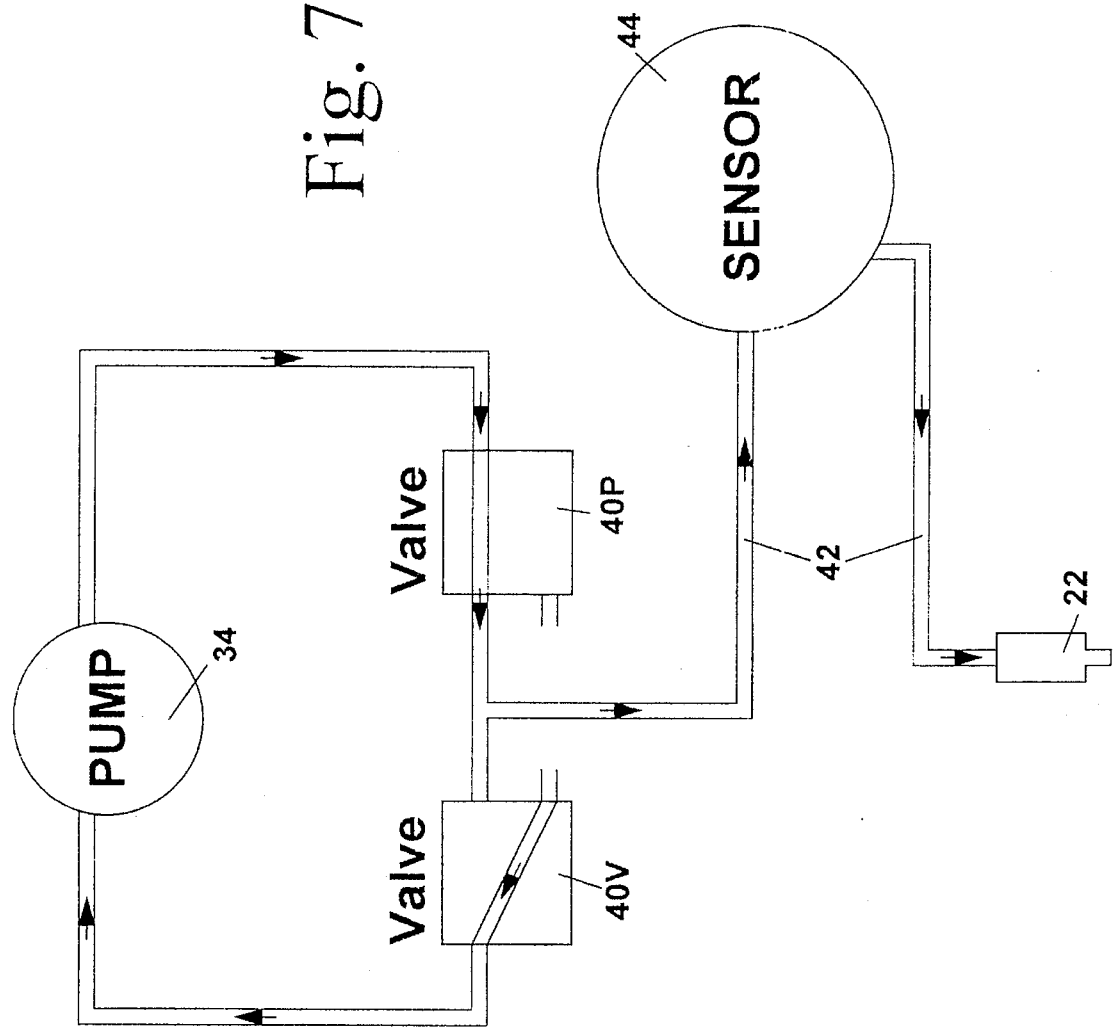
Figure 8:
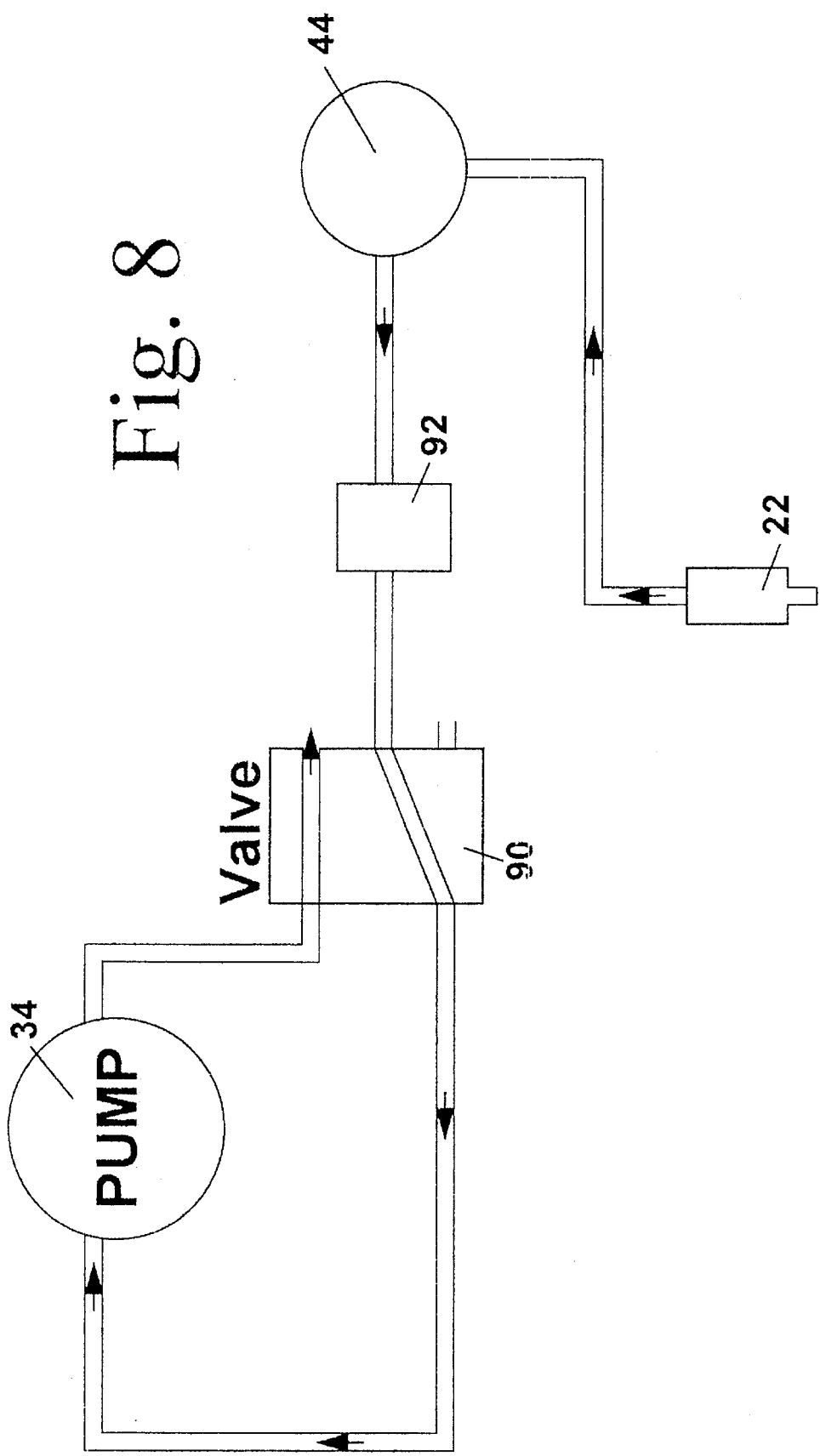
FIGS. 8–9 are diagrams showing the arrangement of a single four-way valve, pressure sensing transducer and pump of an alternative embodiment of the present invention for applying vacuum and pressure, respectively, to the injector device.
Figure 9:
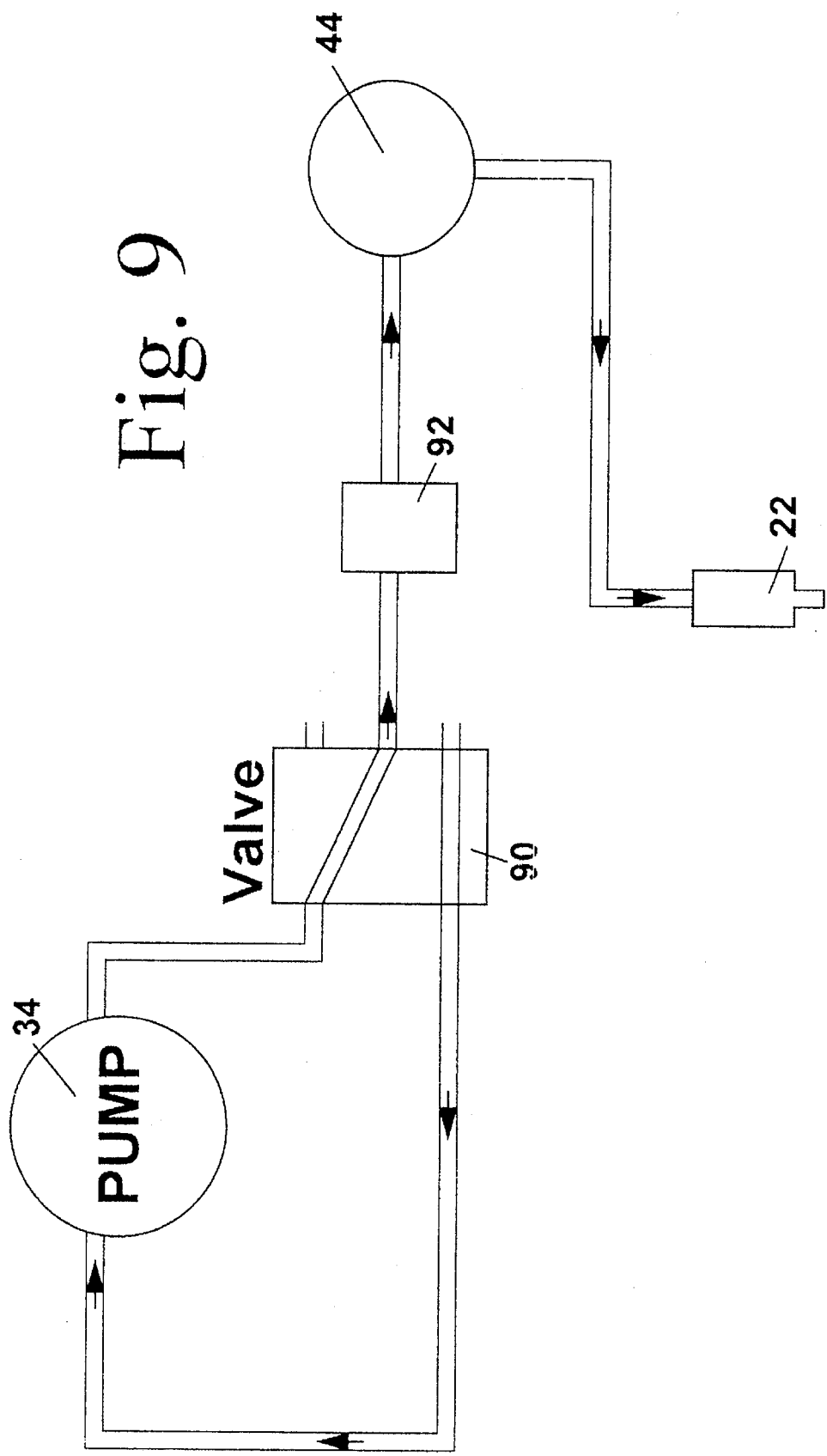

The main case 10 encloses components schematically represented in FIG. 5 including a power source such as a rechargeable sealed lead-acid battery 32, an electrically operated air pump 34 which is powered by the battery 32, pressure and vacuum lines 36 and 38 from the air pump to air valve assemblies 40P and 40V which are paired in a dual three-way valve 40 and which control air flow to and from the primary air hose line 42, an electrical pressure sensor transducer 44 which is part of a circuit means capable of generating electrical signals in response to the pressure or vacuum in the primary hose line 42, and a electrical control printed circuit board (PCB) 46 embodying a computer processor and most of the circuit means which provides for generating and responding to the electrical sensor signals and for correlating and coordinating the operation of the other respective elements of the glass repair apparatus.

The portion of the control means for the pump 34 and valves 40V and 40P for changing between the application of vacuum and pressure to the injector reservoir includes, in addition to the sensor 44, a micro computer unit 50 on the PCB 46 incorporating at least part of said control circuitry means and means for storing all of several selectable control programs described later. This micro computer unit includes a conventional central processing unit (CPU) 52 with conventional random access memory (RAM), read only memory (ROM) and appropriate input/output (IO) devices coupled to control elements as necessary to perform the preprogrammed stored processes described below. Among the IO devices are a bank of terminals 53 shown in FIG. 5 and conventional multiple conductor electrical cable connecting points 53L, 53K and 53S seen in FIG. 5 for connector cables leading to the LCD display 16, keyboard membrane switches 14 and the sensor transducer 44, respectively. The read only memory may include an erasable programmable read only memory (EPROM) 54 or an equivalent memory which is unalterable by the operator during use of the apparatus. The EPROM 54 may be on a plug-in integrated circuit chip which is removable for altering the stored programs as desired using well known EPROM programming apparatus and techniques.

The exterior of the main case is provided with a membrane control panel 11 having a plurality (sixteen) of individually identified buttons or switches which allow the operator to turn on/off via switch 12, test via switch 60 or cancel via switch 62 the operation of the apparatus, or manually control drill speed via switches 68U or 68D or pump operation via switches 64V or 64P, as well as select, when desired, any one of nine specific preprogrammed operating sequences with the push of a single button. The liquid crystal display (LCD) panel 16 provides a visual display of alphanumeric information to indicate the operational status of the device.

The touch of a single finger on a selected membrane switch on the control panel 11 is sufficient to start an entire automated repair process. The control apparatus contains specialized programs and automatic repair sequences which have individual membrane switches for the various repair categories of bulls eyes, star breaks, combination breaks and some special situations. The automatic programming provides at the LCD panel 16 information which provides the status of the repair to the operator at all times during the repair process. This panel shows exact vacuum and pressure readings, what mode of operation the system is in, how long the repair will take and when the repair is finished. During the repair process the sensitive pressure sensor 44 in the control portion of the apparatus continually monitors and analyzes the current vacuum or pressure sending vacuum or pressure signals to the computer processor. Condition responsive means in the micro computer unit 50 interprets these signals in combination with preprogrammed time interval signals generated in the microcomputer unit 50 for successive vacuum and pressure cycles to make all necessary adjustments in the control means for optimum alternate cycling of the vacuum and pressure levels at the reservoir 23 in injector nozzle 22 over the damaged area being repaired. Because it may be desirable to drill the damaged area to provide a clear path from the surface of the glass to the interior of the damaged area in to which where resin will be injected, a port or receptacle 66 to allow electrical connection of an electrically operated drill (not shown) is provided at a side of the main box. Power to the port 66 for control of drill speed is adjustably selectable to different upper or lower fixed levels by pressing switch 68U or 68D, respectively, until the desired speed within the range of drill operation is achieved.

The main case 10 is further provided with an electrical receptacle 70 which allows connection of either a source of power for the purpose of recharging the internal battery or an additional electrical device which may be powered by the battery, such as an ultraviolet lamp (not shown) used to cure the resin.

In use of this automated system, the resin injector assembly 22 is secured and sealed in place over a damaged portion of a windshield in such a manner that the resin reservoir 23 within the assembly communicates with the interior of the damaged area though the resin injector nozzle. The resin reservoir 23 communicates with the primary hose 42 which is capable of selectively applying either vacuum or air pressure to the resin reservoir and the damaged area by means of a pair of "three-way" mechanical valves 40V and 40P which are operated simultaneously to allow the primary hose to communicate with either the inlet or outlet of an electrically operated air pump. The transducer or pressure sensor 44 located along the primary hose path and within the main case provides a means of measuring the pressure or vacuum in the line 42, and transmits the measured pressure in the form of an electrical signal to the micro computer unit 50 on the main printed circuit control board 46 which in turn controls the operation of the air pump and the position of one the three way valves to control whether pressure or vacuum will be supplied to the resin injector.

With the damaged area prepared as may be appropriate and the injector in position, the apparatus of the present invention is operated by means of a membrane switch on the face of a main control unit. Once set in operation, the device automatically steps through a sequence which has been preprogrammed into the apparatus and which may be selected to correspond to the type of damage being repaired. In an example of a typical sequence, the air pump 34 is activated with the vacuum/pressure valves 40V and 40P being controlled to apply vacuum to the injector 22. When the transducer 44 in the air line senses a sufficient vacuum, and produces a signal indicative of the need to commence a timed energization of vacuum application, the vacuum is held for a approximately 90 seconds or other preprogrammed period of time. After the programmed time has elapsed, the valve or valves are electrically operated to reverse the airflow so that the air pump 34 supplies pressure to the injector line. When the transducers in the air line sense a sufficient pressure, and produces a signal indicative of the need to commence a timed energization of pressure application, for example 30 p.s.i., this pressure is maintained for approximately 30 seconds or other preprogrammed period of time. The sequence of application of preprogrammed vacuum followed by pressure is programmed to be automatically repeated several times, typically with variations in the durations of vacuum and pressure along with variations in the amount of pressure applied. The pressure will typically be slightly increased with each step so that the procedure's greatest pressure is achieved at the completion of the procedure.

Throughout this specification reference has been made to making repairs at a damaged area of the windshield. This is intended to mean repairs that are recognized in the art as possible by a process of this general nature. The following general description identifies repairable breaks of several well known types for which this invention has application.

Bullseye breaks are on the outside layer of glass which extends to the vinyl center layer. This type of break is shaped like a cone, with its tip at the outside surface of the windshield and its base at the vinyl layer. Occasionally there are small radial cracks, ¼" or less, in these breaks.

Partial Bullseye breaks are generally no larger than ½" and have a very small pit at the impact point.

Star breaks have two or more radial cracks extending from a central impact pit.

Combination breaks are a combination of both a bullseye break and a star break, with radial cracks extending out of the bullseye.

The computerized circuitry of the preferred embodiment includes several distinct preprogrammed sets of instructions each of which provides a distinct series of alternating cycles of vacuum and pressure applied to the repair material in the injection nozzle. The following selectable programs have been found suitable for the type of beak described with each program. The table with each program indicates in minutes the duration of the alternating vacuum and pressure cycle portions. The vacuum is quickly drawn down, reaching a maximum in about four seconds and is maintained at about 30 inches of mercury during each vacuum cycle portion. Each of the nine listed programs is selected, after turning the apparatus on via switch 12 and after "Select Program" appears in the LCD window 16, by pressing a respective single one-touch membrane switch on the control panel 11 of FIG. 2. Each program is initiated with application of vacuum and concludes with application of pressure.

The Bullseye 1 program is designed for less complicated bullseye breaks that can be completed in less time than larger, more complicated breaks.

| BULLSEYE 1 | |
|---|---|
| Vacuum | 1.5 min. |
| 30 psi Pressure | .5 |
| Vacuum | 1.0 |
| 35 psi Pressure | 2.0 |
| Vacuum | .5 |
| 37 psi Pressure | 3.0 |

The Bullseye 2 program is designed for larger, more complicated breaks.

| BULLSEYE 2 | |
|---|---|
| Vacuum | 2.0 min. |
| 30 psi Pressure | .75 |
| Vacuum | 1.5 |
| 35 psi Pressure | 3.0 |
| Vacuum | 1.0 |
| 38 psi Pressure | 4.0 |
| Vacuum | .5 |
| 40 psi Pressure | 2.0 |

The Bullseye w/Pulse program is designed for more complicated breaks that may have stubborn trapped air pockets that cannot be evacuated with the standard alternating pressure & vacuum cycles. This program is similar to a standard bullseye program, but with the added Pulse mode. The pulse cycle rapidly alternates between 4 seconds of vacuum and a pressure of 40–46 psi, creating a "bouncing" effect to dislodge remaining trapped air.

| BULLSEYE w/PULSE Same as Bullseye 2 followed by alternating: | |
|---|---|
| Vacuum | 4 sec. |
| 40 psi pressure | until reached |
| PULSE CYCLE | (repeated 6 times with pump left on) |
| Pressure 40 psi | 2 min |

The Combo 1 program is designed for less complicated combination breaks that require less repair time than larger, more difficult breaks.

| COMBO 1 | |
|---|---|
| Vacuum | 2.0 min. |
| 32 psi Pressure | .75 |
| Vacuum | 1.0 |
| 35 psi Pressure | 2.0 |
| Vacuum | .5 |
| 37 psi Pressure | 4.0 |
| Vacuum | .25 |
| 37 psi Pressure | 3.0 |

The Combo 2 program is designed for larger, more difficult breaks.

| COMBO 2 | |
|---|---|
| Vacuum | 2.0 min. |
| 32 psi Pressure | .75 |
| Vacuum | 1.0 |
| 35 psi Pressure | 2.0 |
| Vacuum | .5 |
| 40 psi Pressure | 3.0 |
| Vacuum | .25 |
| 46 psi Pressure | 4.0 |
| Vacuum | .25 |
| 48 psi Pressure | 2.0 |

The Combo w/Pulse program is designed for more complicated combination breaks that may contain stubborn trapped air that cannot be evacuated with the standard alternating pressure and vacuum cycles. This program is similar to Combo 2, but with the added "Pulse" mode described above toward the end of the program.

| COMBO W/Pulse | |
|---|---|
| Vacuum | 2.0 |
| 32 psi Pressure | .75 |
| Vacuum | 1.0 |
| 35 psi Pressure | 2.0 |
| Vacuum | .5 |
| 40 psi Pressure | 2.5 |
| Vacuum | .25 |
| 46 psi Pressure | 5.0 |
| Vacuum | 4 sec. |
| 40 psi pressure | till reached |
| PULSE CYCLE | (repeated 6 times with pump left on) |
| 46 psi Pressure | 2.0 |

The Star 1 program is designed for star breaks that are more open in nature and require less time for resin penetration than very tight breaks.

| STAR 1 | |
|---|---|
| Vacuum | 1.0 |
| 32 psi Pressure | 2.0 |
| Vacuum | .5 |
| 35 psi Pressure | 5.0 |
| Vacuum | .25 |
| 40 psi Pressure | 6.0 |

Star 2 program is designed for star breaks requiring more penetration time for the resin to completely fill all their tight cracks.

| STAR 2 | |
|---|---|
| Vacuum | 1.0 |
| 33 psi Pressure | 2.0 |
| Vacuum | .5 |
| 35 psi Pressure | 5.0 |
| Vacuum | .25 |
| 46 psi Pressure | 9.0 |
| Vacuum | .25 |
| 46 psi Pressure | 1.0 |

The Pulse Only program is designed to remove stubborn trapped air pockets if they are remaining after other automated programs are finished. The pulse program alternates vacuum and pressure, creating a bouncing effect to dislodge remaining trapped air.

| PULSE ONLY | |
|---|---|
| Vacuum | 4 sec. |
| 45 psi Pressure | when reached |
| Repeat PULSE CYCLE | six times. |
| 45 psi Pressure | 2 min. |

After each of the "one-touch" programs is completed, "Finished" will be displayed for five seconds on the LCD display panel 16, after which "Select Program" will be displayed for fifteen minutes, followed by the machine automatically turning off. However, it is advisable to manually turn off the machine when finished to avoid excess battery drainage.

Because the system of the present invention is self-contained and powered by a battery having a limited life, it may be desirable to insure that use of the pump is minimized. Accordingly, a check valve 92 may be positioned in the primary air line 18 between the valve assembly 40 or 90 and the pressure sensor 44 and opened only during actuation of the air pump in order to seal the air line against leakage of pressure or vacuum through the valve assembly, pump or any of the other system components. Such a check valve is shown in FIG. 5 connected to the same terminals which energize the pump 34. Such a valve is omitted in FIGS. 6–7 which uses three-way valves 40V and 40P, but the check valve is used in FIGS. 8–9 where a four-way valve is used to control application of vacuum and pressure to the injector 22. If the valve assemblies 40 (40V and 40P) or 90 have essentially no leakage, the check valve 92 may be omitted.

The preferred method of operation is fully automatic by one-touch program selection when the apparatus is turned on by switch 12 and the LCD window 16 on the control panel indicates "Select Program". However, instead of using a one-touch selection for fully automatic operation, a full manual override of automatic operation can be enabled at this time merely by pressing vacuum switch 64V or pressure switch 64P, while still making available data on the LCD panel relating to the current operating conditions and enabling manual control of application of vacuum and adjustable pressure determined by pressing vacuum switch 64V or pressure switch 64P for cycle durations continuing under manual and pressure sensor control until the cancel switch 62 is pressed. During pressure operation the pressure can be progressively increased by holding switch 64P closed until a desired pressure is indicated at the LCD window 16, or it can be "bumped up" in steps by quickly tapping and releasing the switch 64P. Reduction in indicated pressure can be achieved by tapping the 64V switch to bleed off pressure. Maximum vacuum is achieved if the pump applies vacuum for four seconds. If during an automatic operation the operator desires to take over manual control, the cancel switch 62 can be pressed to interrupt the automatic program. After two seconds the LCD window 16 indicates "Select Program" and the above manual override operation can be similarly performed.

The control board is programmed so that during such manual operation, if a preset maximum desirable pressure, for example 75 psi, is detected by the sensor, the operation of the pump is terminated and/or the valve assembly is actuated to release pressure from the primary air line. This function provides a degree of protection against additional damage which might otherwise result from the application of excessive pressures to a damaged area of glass. Similarly the automation of the control of the duration and amount of pressure or vacuum during a manual operation can be utilized so that an operator need not monitor nor manually control those values.

Since the preferred resin for use with this apparatus is a resin cured by ultraviolet light, the break area being repaired should be shaded from ultraviolet rays until ready for curing. Curing takes about three minutes under sunlight or under an ultraviolet lamp.

When using pressures above 40 psi care must be taken to assure that the injector nozzles remain anchored to the glass during repair.

It will be apparent from FIG. 5 that the control elements within the main case 10 can be and are modular in nature to enable quick trouble shooting merely by substitution of parts. The printed circuit board is removable as a separate unit together with the central processing unit and other circuitry mounted thereon. Conventional ribbon cable connectors (not shown) connect the printed circuit board to the LCD display on the control panel and to the keyboard membrane switches and other controls on the face of the keyboard or in case 10. Similarly the electrical receptacles, pump, valves, and battery are readily removable.

Although the pump means used in the preferred embodiment incorporates a single electric pump for both vacuum evacuation and for positive air pressure on the repair material, the invention may utilize individual electric pumps which may be selectively actuated by similarly performing timing and sensing controls. Also it is possible to use a container or other source of pressurized air or gas fluid with appropriate valve means to directly supply positive pressure to the repair material in combination with a suitable pump for applying vacuum. Such a pump may be electrical or it can be a valve controlled pump driven by pressurized fluid such as air or gas from a portable refillable container used in lieu of the rechargeable battery as a rechargeable energy source. If a fluid pressure actuated pump is used for both applying both the vacuum and the positive pressure to the repair material, a battery is still essential for the computerized control circuits, but the battery drain can be substantially reduced, particularly if the vacuum and pressure valve devices are bistable and require little or no energy except to change their states of operation. The plug-in drill may also be a pneumatic device powered by pressurized fluid with appropriate controls to set or limit its speed for the same purposes as in the preferred embodiment.

Other variations within the scope of this invention will be apparent from the described embodiment and it is intended that the present descriptions be illustrative of the inventive features encompassed by the appended claims.

What is claimed is:

1. Apparatus for use in repairing a damaged area of a glass windshield by filling the damaged area with a repair material, said apparatus comprising a reservoir means for holding a liquid repair material in communication with an interior part of the damaged area;

first pump means for applying vacuum to said damaged area, second pump means for applying pressure to said repair material and to said damaged area, control means for changing between application of vacuum and pressure by said pump means without operator intervention, condition responsive means for generating a first signal indicative of the need for energizing of the first pump means for application of said vacuum at said damaged area and an alternative second signal indicative of the need for energizing of the second pump means for application of said pressure at said damaged area, said control means being responsive to said condition responsive means to apply at least one cycle of applying vacuum for a controlled period of time and then applying pressure for a succeeding controlled period of time.

2. Glass repair apparatus according to claim 1 wherein said control means actuates said first and second pump means to provide at least one cycle of applying vacuum for a predetermined period of time to said damaged area and then applying pressure for another predetermined period of time.

3. Glass repair apparatus according to claim 2 wherein said control means provides multiple such cycles of operation of said first and second pump means.

4. Glass repair apparatus according to claim 3 wherein said predetermined periods of time for applying pressure progressively increase in duration in several successive cycles.

5. Glass repair apparatus according to claim 3 wherein said predetermined periods of time for applying vacuum progressively decrease in duration in several successive cycles.

6. Glass repair apparatus according to claim 4 wherein said predetermined periods of time for applying vacuum progressively decrease in duration in several successive cycles.

7. Glass repair apparatus according to claim 1 wherein said condition responsive means comprises sensor means capable of measuring vacuum or pressure applied to said damaged area.

8. Glass repair apparatus according to claim 1 wherein said second pump means includes an electrically operated pump and said control means comprises valve means for controlling the application of pressure from said second pump means to said damaged area.

9. Glass repair apparatus according to claim 1 wherein said first pump means includes an electrically operated pump and said control means comprises valve means for controlling the application of vacuum from said first pump means to said damaged area.

10. Glass repair apparatus according to claim 1 wherein said first and second pump means share a common electric pump and said first and second pump means each have different valve means controlled by said control means whereby said common electric pump may be operated to create said vacuum or said pressure at said damaged area.

11. Glass repair apparatus according to claim 10 wherein each said valve means comprises a three-way valve.

12. Glass repair apparatus according to claim 11 wherein said three-way valves are simultaneously actuated from respective first positions to respective second positions to apply a vacuum to said damaged area and wherein said three-way valves are simultaneously actuated from respective second positions to respective first positions to enable application of pressure by said pump to said damaged area.

13. Glass repair apparatus according to claim 1 wherein said second signal is indicative of pressure supplied to said damaged area and wherein said control means responds to said second signal to progressively raise the maximum pressure at said damaged area during each of several successive periods of application of pressure to the damaged area.

14. Glass repair apparatus according to claim 1 wherein said second pump means includes means for limiting the maximum pressure during each cycle of operation of the second pump means.

15. Glass repair apparatus according to claim 1 wherein said control means provides multiple cycles of alternating operation of the first and second pump means.

16. Glass repair apparatus according to claim 15 wherein at least the periods of operation of the second pump means have durations preselected by said control means.

17. Glass repair apparatus according to claim 15 wherein said control means initiates operation of said multiple cycles of the apparatus with vacuum applying operation of the first pump means and concludes the operation of the apparatus with pressure applying operation of the second pump means.

18. Glass repair apparatus according to claim 15 wherein said control means has a control panel with a single manually operable control member which is actuatable to effect performance of a complete series of said multiple cycles of operation of to produce an air and void free filling of repair material in said damaged area.

19. Apparatus for use in repairing a damaged area of a glass windshield in accordance with claim 1 wherein each said pump means includes an electrically operated pump.

20. Apparatus for repairing a glass windshield by filling a damaged area with a repair material, said apparatus comprising an injector nozzle having a reservoir for holding an uncured liquid repair material, means for sealing said nozzle over the damaged area of the windshield, pump means for automatically supplying said reservoir with timed alternating vacuum and positive precision controlled pressures from a fluid pressure device, sensor means for measuring the amounts of vacuum and positive pressures applied to the reservoir, and preprogrammed control circuitry means including timing means and means responsive to said sensor means for measuring and regulating the amounts and durations of the vacuum and positive pressures applied to the reservoir, said control circuitry means including several different selectable control programs and including a different distinct selection switch means for selecting each selectable control program for automatic operation of a complete repair cycle for the selected program without operator intervention.

21. Apparatus for repairing a glass windshield by filling a damaged area with a repair material, said apparatus comprising an injector nozzle having a reservoir for holding an uncured liquid repair material, means for sealing said nozzle over the damaged area of the windshield, pump means for automatically supplying said reservoir with timed alternating vacuum and positive precision controlled pressures from a fluid pressure device, sensor means for measuring the amounts of vacuum and positive pressures applied to the reservoir, and preprogrammed control circuitry means including timing means and means responsive to said sensor means for measuring and regulating the amounts and durations of the vacuum and positive pressures applied to the reservoir.

22. Apparatus for repairing a glass windshield by filling a damaged area with a repair material in accordance with claim 21 wherein said control circuitry means including several different selectable control programs and including different distinct selection switch means for selecting each selectable control program.

23. Apparatus for repairing a glass windshield by filling a damaged area with a repair material in accordance with claim 22 wherein the control circuitry means automatically responds to said timing means and to said sensor means for applying to said reservoir for each selectable control program a distinct program of several cycles of alternating application of vacuum and pressure to the reservoir without operator intervention.

24. Apparatus for repairing a glass windshield by filling a damaged area with a repair material in accordance with claim 21 wherein the apparatus is portable and self-contained whereby it requires no external energy sources for windshield repair operations.

25. Apparatus for repairing a glass windshield by filling a damaged area with a repair material in accordance with claim 21 and including a micro computer unit with means providing multiple different selectable programs for application of vacuum and pressure to the reservoir and incorporating at least part of said control circuitry means and means for storing and selecting said selectable programs.

26. Apparatus for repairing a glass windshield by filling a damaged area with a repair material in accordance with claim 25 wherein said control circuitry means including several selectable control programs and including a distinct selection switch means for selecting each selectable control program for automatic operation of a complete repair cycle for the selected program without operator intervention, and further including switch means to override such automatic operation to enable successive manually controlled alternating cycles of application of vacuum and pressure to repair material.

* * * * *